United States Patent
Wilson et al.

(10) Patent No.: US 10,557,343 B2
(45) Date of Patent: Feb. 11, 2020

(54) SENSOR CONSTRUCTION FOR DISTRIBUTED PRESSURE SENSING

(71) Applicant: Schlumberger Technology Corporation, Sugar Land, TX (US)

(72) Inventors: Colin Allan Wilson, Sugar Land, TX (US); Arthur Hartog, Winchester (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/686,270

(22) Filed: Aug. 25, 2017

(65) Prior Publication Data
US 2019/0063212 A1    Feb. 28, 2019

(51) Int. Cl.
| | |
|---|---|
| E21B 47/00 | (2012.01) |
| E21B 47/06 | (2012.01) |
| G02B 6/44 | (2006.01) |
| G01M 11/08 | (2006.01) |
| E21B 47/12 | (2012.01) |

(52) U.S. Cl.
CPC .......... *E21B 47/06* (2013.01); *G01M 11/085* (2013.01); *G02B 6/443* (2013.01); *G02B 6/4415* (2013.01); *E21B 47/12* (2013.01)

(58) Field of Classification Search
CPC ........ G02B 6/44; G02B 6/4415; G02B 6/443; E21B 47/06; E21B 47/12; E21B 47/123; G01M 11/085

See application file for complete search history.

(56) References Cited

U.S. PATENT DOCUMENTS

| | | | | |
|---|---|---|---|---|
| 4,696,543 A | * | 9/1987 | Pitt | G02B 6/4401 385/102 |
| 4,786,138 A | * | 11/1988 | Buckley | G02B 6/4401 385/110 |
| 4,830,458 A | * | 5/1989 | Hiltebrandt | G02B 6/4403 385/115 |
| 4,852,790 A | | 8/1989 | Karlinski | |
| 4,896,940 A | * | 1/1990 | Kathiresan | G02B 6/4403 385/112 |
| 5,686,986 A | | 11/1997 | Li et al. | |
| 5,828,059 A | | 10/1998 | Udd | |
| 5,841,131 A | | 11/1998 | Schroeder et al. | |

(Continued)

FOREIGN PATENT DOCUMENTS

| | | |
|---|---|---|
| EP | 0348235 A2 | 12/1989 |
| GB | 2140554 A | 11/1984 |
| WO | WO2006099056 A2 | 9/2006 |

OTHER PUBLICATIONS

Xie, H. M., Dabkiewicz, P., Ulrich, R. et al., "Side-hole fiber for fiber-optic pressure sensing," Opt. Lett., 11(5), 333-5 (May 1986).
(Continued)

*Primary Examiner* — Francis C Gray
(74) *Attorney, Agent, or Firm* — Eileen Pape

(57) ABSTRACT

An optical-fiber-containing sensor wire with at least one hermetically sealed optical fiber are provided. An optical-fiber-containing sensor wire may be installed in a cable that can be placed downhole in a wellbore. The optical-fiber-containing sensor wire may include a first optical fiber hermetically sealed within a metallic structure of the optical-fiber-containing sensor wire.

20 Claims, 7 Drawing Sheets

(56) References Cited

U.S. PATENT DOCUMENTS

| | | | |
|---|---|---|---|
| 5,925,879 A * | 7/1999 | Hay | E21B 33/1243 250/227.14 |
| 6,218,661 B1 | 4/2001 | Schroeder et al. | |
| 6,246,048 B1 | 6/2001 | Ramos et al. | |
| 6,304,686 B1 | 10/2001 | Yamate et al. | |
| 6,363,180 B1 | 3/2002 | Yamate et al. | |
| 6,545,760 B1 | 4/2003 | Froggatt et al. | |
| 7,324,730 B2 | 1/2008 | Varkey et al. | |
| 7,548,319 B2 | 6/2009 | Hartog | |
| 7,859,654 B2 | 12/2010 | Hartog | |
| 7,940,389 B2 | 5/2011 | Rogers et al. | |
| 8,401,401 B2 | 3/2013 | Hartog et al. | |
| 9,201,207 B2 | 12/2015 | Varkey et al. | |
| 10,049,789 B2 | 8/2018 | Varkey | |
| 2002/0196993 A1 | 12/2002 | Schroeder | |
| 2006/0153508 A1* | 7/2006 | Bowker | E21B 23/08 385/100 |
| 2008/0053654 A1* | 3/2008 | Ullah | E21B 47/123 166/250.1 |
| 2008/0118209 A1* | 5/2008 | Varkey | G02B 6/4486 385/101 |
| 2008/0210426 A1 | 9/2008 | Lemcke et al. | |
| 2012/0224801 A1* | 9/2012 | Laing | G02B 6/4428 385/12 |
| 2013/0034324 A1* | 2/2013 | Laing | G01K 11/32 385/13 |
| 2013/0071074 A1* | 3/2013 | Kurtscheid | G02B 6/443 385/101 |
| 2013/0188168 A1* | 7/2013 | Hartog | E21B 47/102 356/32 |
| 2014/0367121 A1* | 12/2014 | Varkey | E21B 47/123 166/385 |
| 2015/0170799 A1 | 6/2015 | Varkey et al. | |
| 2015/0323405 A1* | 11/2015 | Halmetschlager | G01L 11/025 356/32 |
| 2016/0024902 A1 | 1/2016 | Richter et al. | |
| 2016/0025945 A1 | 1/2016 | Wanjau et al. | |
| 2017/0010385 A1 | 1/2017 | Englich et al. | |
| 2017/0186512 A1 | 6/2017 | McFarland et al. | |

OTHER PUBLICATIONS

Papp, B., D. Donno, J. E. Martin, and A. H. Hartog, A study of the geophysical response of distributed fibre optic acoustic sensors through laboratory-scale experiments. Geophys. Prosp.: Sep. 2016, doi:10.1111/1365-2478.12471, 65, pp. 1186-1204.

Hartog, A. H., L. B. Liokumovich, and O. I. Kotov, 2013, The optics of distributed vibration sensing, EAGE—Stavanger, EAGE, Second EAGE Workshop on Permanent Reservoir Monitoring, Norway, Jul. 2-5, 2013 (5 pages).

International Search Report and Written Opinion issued in the related PCT Application PCT/US2018/048044, dated Dec. 18, 2018 (11 pages).

* cited by examiner

SENSOR CONSTRUCTION FOR DISTRIBUTED PRESSURE SENSING

BACKGROUND

This disclosure relates to a system and method for acquiring distributed measurements of desired parameters within a wellbore using one or more optical fibers embedded within a conductor of a downhole cable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties and characteristics of the geological formation surrounding the wellbore. Thus, when a wellbore is investigated to determine the physical condition of a fluid within the wellbore, a gas within the wellbore, or the wellbore itself, it may be desirable to place a cable with associated measurement tools and/or sensors within the wellbore.

Such measurement tools and/or sensors may include one or more optical fibers, which may provide high-speed electromagnetic interference (EMI) immune telemetry to a data processing system coupled to the end of the cable. When optical fibers are used to sense parameters such as pressure in a wellbore, which may entail exposing the optical fibers to the borehole fluid in the wellbore, this may damage the optical fibers. The cumulative effect of this damage to the optical fibers over time may cause measurements obtained by the optical fibers become increasingly less accurate.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To allow optical fibers to sense parameters such as pressure in a downhole environment while avoiding damage due to exposure to corrosive borehole fluids, an optical-fiber-containing sensor wire may hold a hermetically sealed optical fiber. In one example, such a cable may include an optical-fiber-containing sensor wire that has a shielding structure, a first optical fiber, and a seal. The shielding structure may have an interior recess that can hold the first optical fiber. The seal may hermetically seal the optical fiber in a longitudinal span of the interior recess.

In another example, a method includes disposing a first optical fiber in an interior recess of a wire shield structure having a longitudinal span that contains the interior recess. The method also includes hermetically sealing the interior recess at least along the longitudinal span of the wire shield structure.

In another example, an optical-fiber-containing sensor wire may be installed in a cable that can be placed downhole in a wellbore. The optical-fiber-containing sensor wire may include a first optical fiber hermetically sealed within a metallic structure of the optical-fiber-containing sensor wire.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Optical fibers within a cable for downhole oilfield use may have point or multiple sensor arrays (where each point of the optical fibers may contribute to a sensing output). A configuration of multiple sensor arrays may provide distributed measurements of desired parameters along the length of the wellbore. A spatial resolution may define the distance over which an optical fiber may contribute to a given output. By deforming (e.g., asymmetrically compressing) the optical fiber, the optical fiber may operate as a pressure sensor that measures pressure distributions throughout a wellbore.

The optical fibers may be physically damaged while in operation within the wellbore through contact with corrosive fluids, abrasion against the wellbore exterior, and/or additional factors of wear. A specific problem in conventional techniques may include encompassing the optical fiber with a shield structure which protects the optical fiber from the harsh environment of the wellbore, while simultaneously retaining the ability of the optical fiber to accurately detect measurements (e.g., pressure). The systems and methods of this disclosure allow for shielding an optical fiber while enabling the optical fiber to measure desired parameters (e.g., pressure) within the wellbore without a loss of signal quality.

Figure 1:
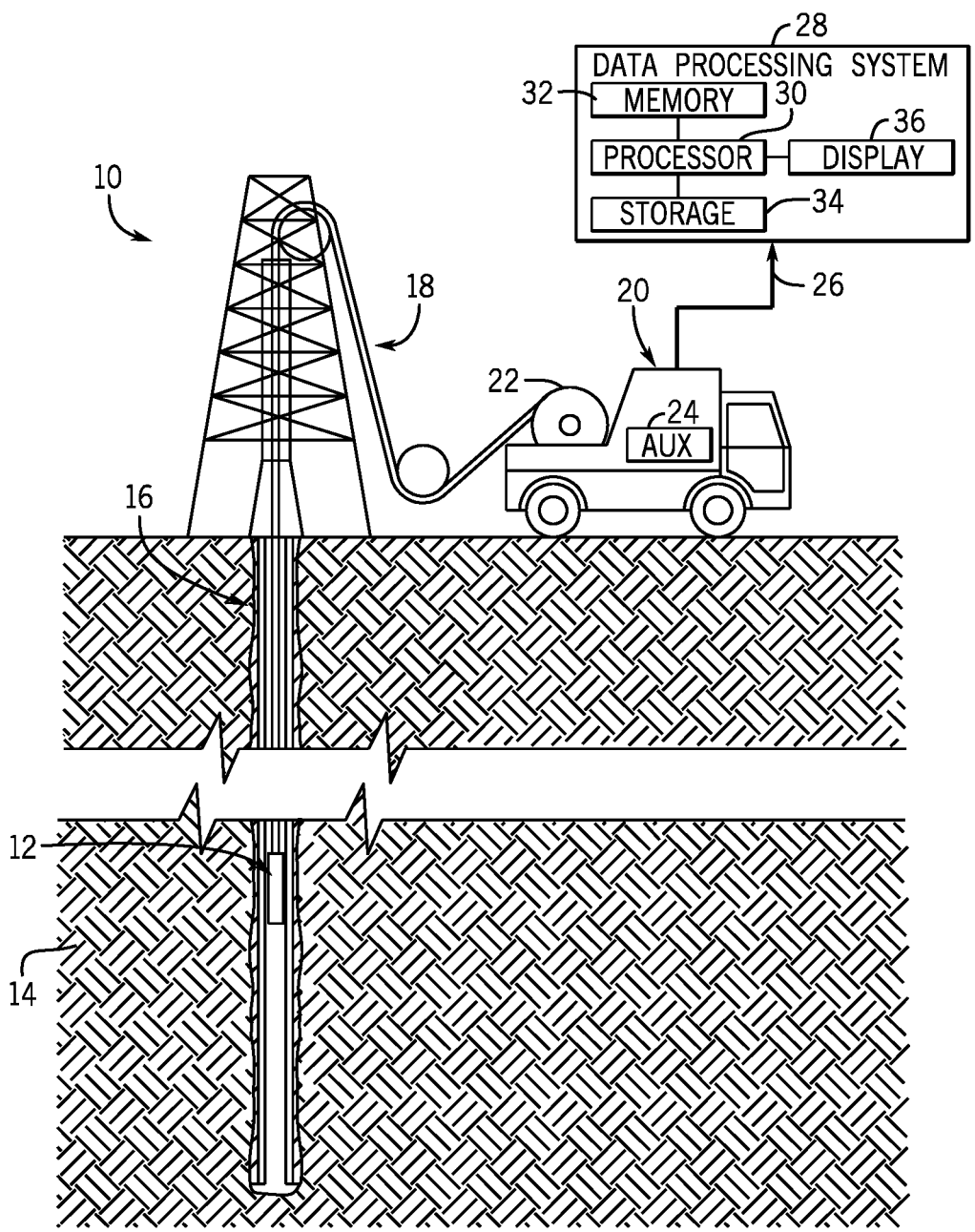
FIG. 1 is a schematic diagram of a wellbore logging system and cable that may obtain data measurements along the length of the wellbore, in accordance with an embodiment of the present disclosure.

With this in mind, FIG. 1 illustrates a well-logging system 10 that may employ the systems and methods of this disclosure. The well-logging system 10 may be used to convey a downhole tool 12 or a dummy weight through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may include one or more optical fibers embedded within the cable. The cable 18 may be spooled and unspooled on a drum 22 and an auxiliary power source 24 may provide energy to the logging winch system 20 and/or the downhole tool 12.

The downhole tool 12 may provide logging measurements 26 to a data processing system 28 via any suitable telemetry (e.g., via electrical or optical signals pulsed through the geological formation 14 or via mud pulse telemetry). The data processing system 28 may process the logging measurements. The logging measurements 26 may indicate certain properties of the wellbore 16 (e.g., pressure, temperature, strain, vibration, or other) that might otherwise be indiscernible by a human operator.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the logging measurements 26.

Figure 2A:
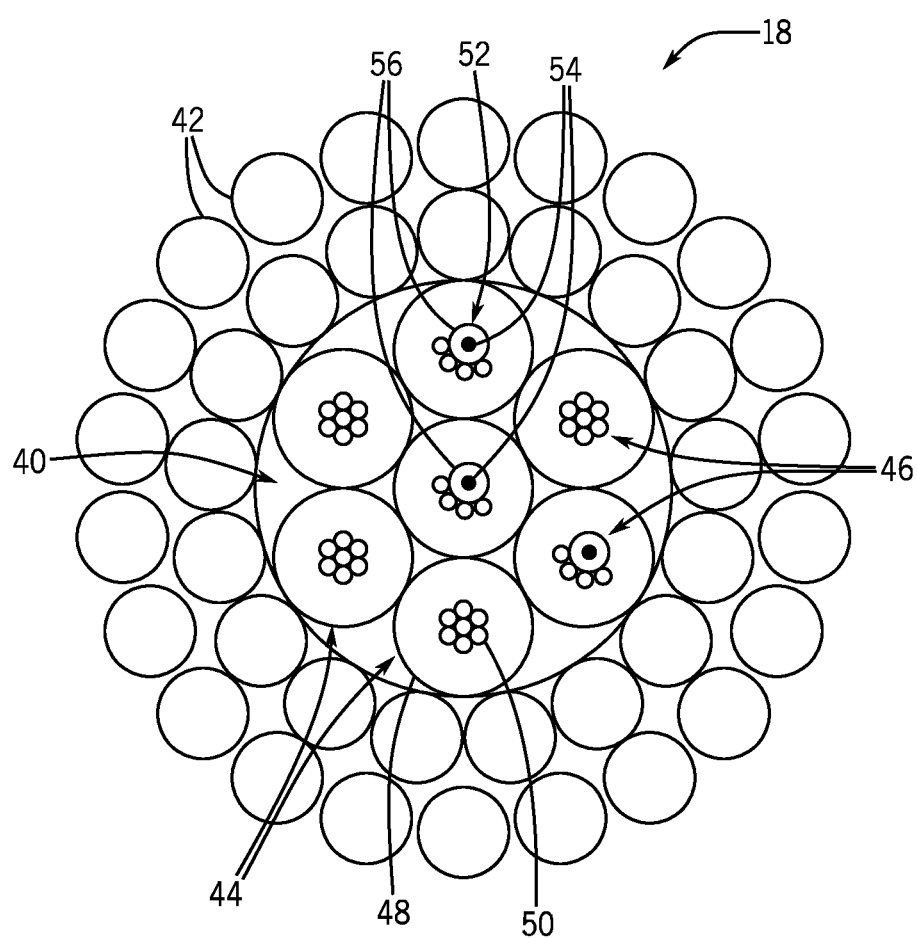
FIG. 2a is a cross-sectional view of the cable of FIG. 1, which illustrates optical-fiber-containing sensor wires disposed within the cable, in accordance with an embodiment of the present disclosure.

FIG. 2a is a cross sectional view of one embodiment of the cable 18. The cable 18 may be continuous or sectioned, and may be 1 meter (m), 10 m, 100 m, 1000 m or more meters in length. The cable 18 may house a cable core 40, which may be circumferentially surrounded by one or more armor wire strength members 42. The armor wire strength members 42 may be served (e.g., coiled helically) around the cable core 40, extend longitudinally along the length of the cable core 40, or be disposed about the cable core 40 in any fashion suitable to surround the cable core 40. The armor wire strength members 42 may physically protect the cable core 40 and may provide additionally rigidity to the cable 18. In addition, the armor wire strength members 42 may support the weight of the cable 18 and alleviate strain on the cable core 40.

The cable core 40 may include one or more signal cables 44. The signal cables 44 may include internal wires 46 disposed within protective structures 48. The internal wires 46 may include copper wires 50, optical-fiber-containing sensor wires 52, or any other suitable wires desired within the cable 18. The optical-fiber-containing sensor wires 52 may include one or more optical fibers 54 disposed within shield structures 56. The one or more optical fibers 54 may serve as sensors (e.g., pressure sensor, temperature sensor) which may sense internal conditions of the wellbore 16 (e.g., pressure, temperature) and relay data regarding the internal conditions to the data processing system 28. The internal wires 46 may additionally transmit instructional signals or electrical power to a component coupled to the end of the cable 18 (e.g., the downhole tool 12). The optical-fiber-containing sensor wires 52 may also be disposed within the armor wire strength member 42.

Figure 2B:
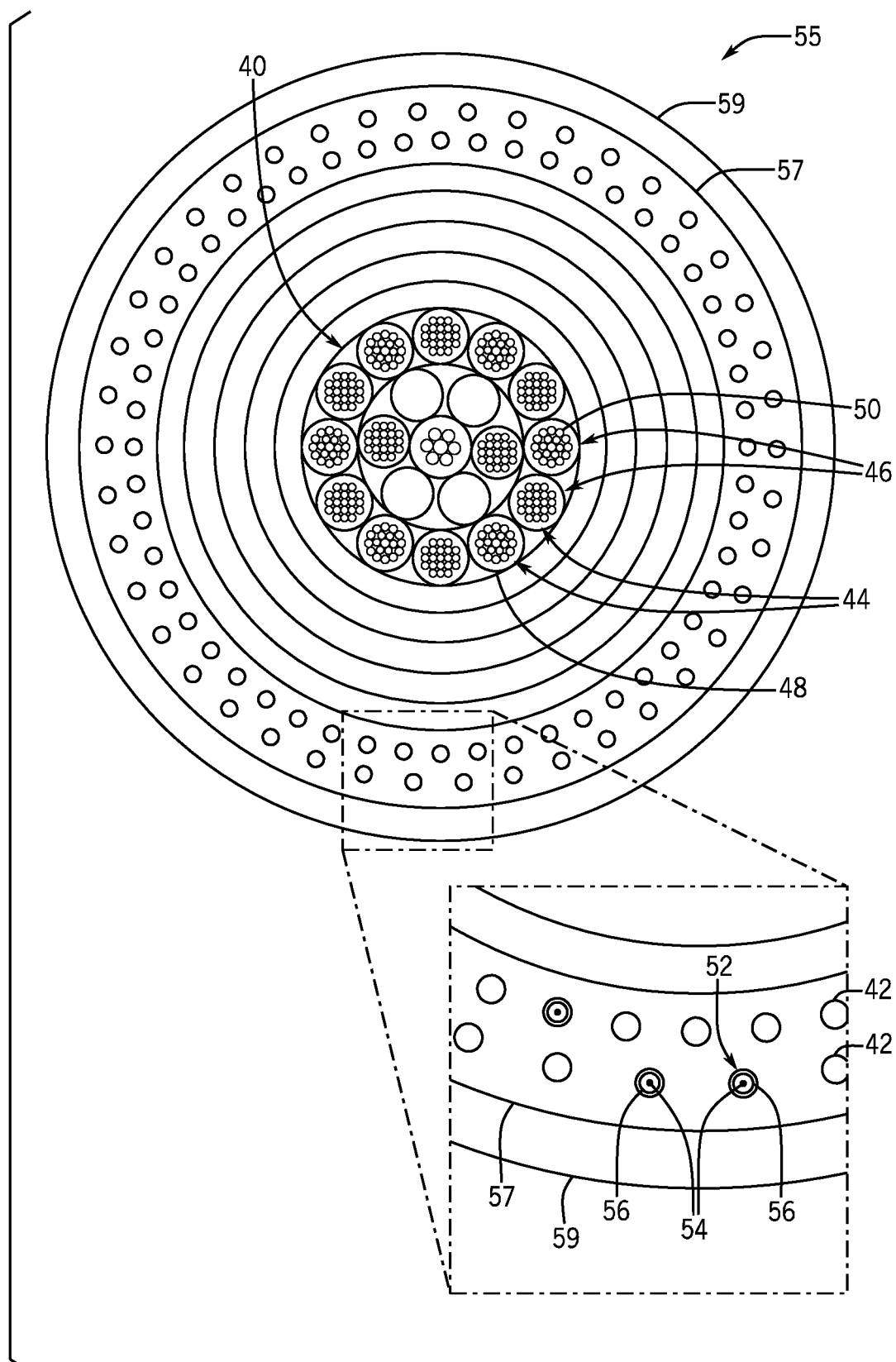
FIG. 2b is a cross-sectional view of a marine cable, which illustrates optical-fiber-containing sensor wires disposed within the cable, in accordance with an embodiment of the present disclosure.

FIG. 2b is a cross sectional view of a marine cable 55. The marine cable 55 may include the cable core 40. The cable core 40 may include the one or more signal cables 44. The signal cables 44 may include the internal wires 46 disposed within the protective structures 48. The internal wires 46 may include the sensors (e.g., the one or more optical fibers 54), copper wires 50, or any other suitable wires desired within the cable 18. The internal wires 46 may also include the optical-fiber-containing sensor wires 52. The internal wires 46 may transmit instructional signals or electrical power to a component coupled to the end of the marine cable 55 (e.g., the downhole tool 12). The protective structures 48 may encase the internal wires 46 and physically protect the internal wires during operation of the cable 18. To achieve a better signal to noise ratio with regard to the parameters being monitored (e.g., temperature, pressure, seismic profiling, or others), the optical-fiber-containing sensor wires 52 may be located near the outside perimeter of the marine cable 55. The optical-fiber-containing sensor wires 52 may be disposed within a shielding layer 57 of the marine cable 55. The shielding layer 57 may additionally be encased by a protective outer layer 59.

Figure 3:
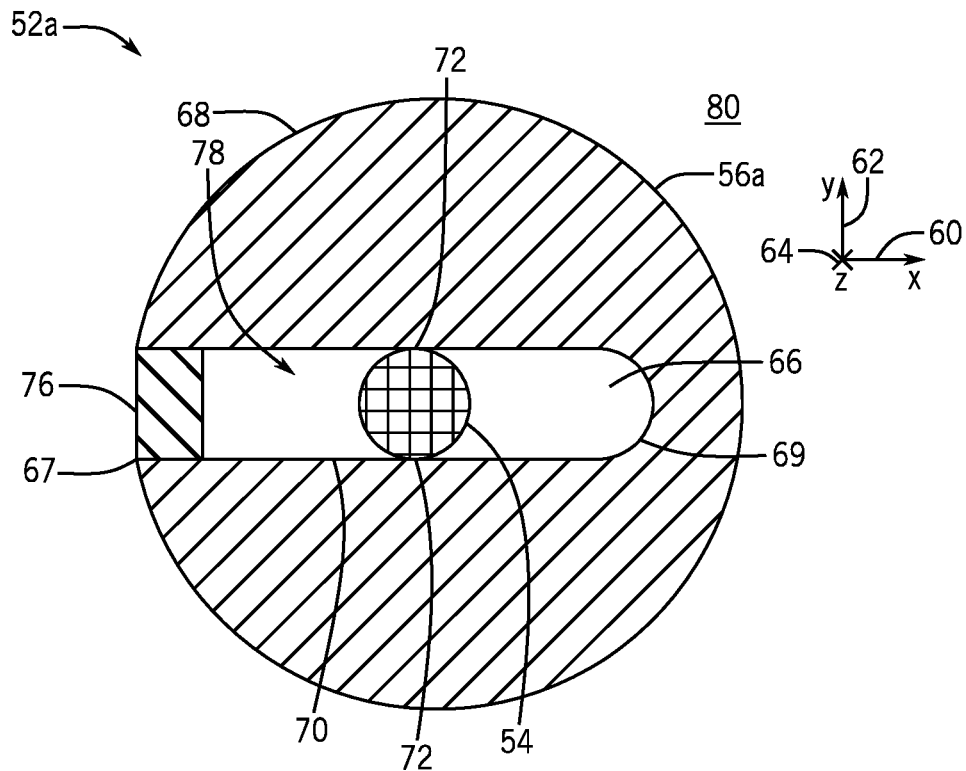
FIG. 3 is a cross-sectional view of an embodiment of the optical-fiber-containing sensor wire of FIG. 2, which illustrates a single-piece optical-fiber-containing sensor wire, in accordance with an embodiment of the present disclosure.

FIG. 3 illustrates a cross-sectional view of an embodiment of a one-piece optical-fiber-containing sensor wire 52*a*. To facilitate discussion, the various embodiments of the optical-fiber-containing sensor wire 52 (e.g., the one-piece optical-fiber-containing sensor wire 52*a*) may be described with reference to an 'x' direction 60, a 'y' direction 62, and a 'z' direction 64. The one-piece optical-fiber-containing sensor wire 52*a* may include a shield structure 56*a* disposed about the one or more optical fibers 54. The shield structure 56*a* may include a conductor (e.g., copper) or any alloy suitable for the desired purpose. The one or more optical fibers 54 may be disposed within a recess 66 of the shield structure 56*a*. The one or more optical fibers 54 may be embedded symmetrically, or asymmetrically within the recess 66. The recess 66 may extend radially from a first end portion 67 adjacent to an exterior surface 68 of the shield structure 56*a* towards a second end portion 69 within shield structure 56*a*. Although FIG. 3 shows an embodiment of the shield structure 56*a* with a generally circular or C-shape, the shield structure 56*a* may take any suitable shape, such as square, triangular, or oval.

The one or more optical fibers 54 may be in physical contact with an interior surface 70 of the recess 66. The interior surface 70 may contact the one or more optical fibers 54 at diametrically opposite contact points 72, such that the interior surface 70 may extend tangentially to the diametrically opposite contact points 72. The diametrically opposite contact points 72 may ensure that any external pressure applied to the shield structure 56*a* will apply a transverse (e.g., 'y' direction 62) force to the one or more optical fibers 54. Ideally, the pressure may be applied to the shield structure 56*a* in a direction perpendicular to the interior surface 70 of the recess 66 (e.g., 'y' direction 62). Additionally or alternatively, pressure may be applied to the shield structure 56*a* in any combination of the 'x' direction 60, 'y' direction 62, and/or 'z' direction 64.

A plug 76 may be inserted into the first end portion 67 of the recess 66, forming an enclosed cavity 78 within the shield structure 56*a*. The plug 76 may be pressure fit into the shield structure 56*a* and/or bonded to the shield structure via a mechanical coupling (e.g., welding, laser welding, bonding glue, or other methods). The plug 76 may extend longitudinally (e.g., 'z' direction 64) along the length of the shield structure 56*a* and form a hermetic seal between the one or more optical fibers 54 within the enclosed cavity 78 and an external environment 80. The external environment 80 may contain fluids that can damage a coating of the one or more optical fibers 54 and result in optical losses within the one or more optical fibers 54. For example, the ingress of hydrogen into the enclosed cavity 78 may result in a subsequent formation of hydroxide ions (OH—) that may absorb light at a number of important wavelengths, thereby decreasing the signal strength of the one or more optical fibers 54.

The plug 76 may additionally form an elongated pressure seal which may ensure that the pressure differential between the enclosed cavity 78 and the external environment 80 is not equalized. The space between the enclosed cavity 78 and the one or more optical fibers 54 may include a buffer fluid.

In one embodiment, the buffer fluid may include a gas such as air; in another, a vacuum may be employed in place of the buffer fluid. Employing air as the buffer fluid may reduce or eliminate variations in pressure readings caused by manometric effects (e.g., the sensor reading the weight of the buffer fluid rather than the external pressure). The buffer fluid can be a gas, liquid, or combination thereof. The plug 76 may include any suitable material, such as copper, aluminum, or organic compounds. Moreover, multiple optical fibers 54 can be inserted in the recess 66 to provide different information. This may be due to the different positions of the multiple optical fibers 54 in the recess 66 (e.g., an optical fiber 54 near the curved internal boundary of the second end portion 69 may see little by way of asymmetric stress due external pressure, but may see a full effect of axial strain). In addition, optical fibers 54 with asymmetric internal structures that inserted in different orientations may experience different responses to external pressure.

Figure 4:
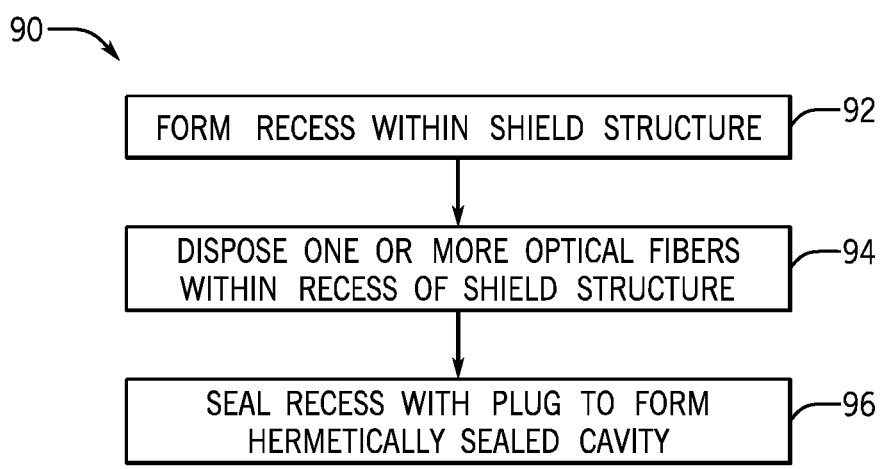
FIG. 4 is a method of manufacturing the single-piece optical-fiber-containing sensor wire of FIG. 3, in accordance with an embodiment of the present disclosure.

FIG. 4 represents a flow diagram of one embodiment of a method 90 for assembling the one-piece sensor 52*a*. In block 92, the recess 66 may be formed within the shield structure 56*a*. The recess 66 may be formed by extruding the shield structure 56*a* through a die, machining the shield structure 56*a*, or any additional suitable method of manufacturing. In block 94, the one or more optical fibers 54 may be disposed within the recess 66 of the shield structure 56*a*. In block 96, the plug 76 may be coupled to the first end portion 67 of the recess 66 to form the enclosed cavity 78 within the shield structure 56*a*. The plug 76 may be coupled to the shield structure 56*a* via press fit (e.g., crimping), a mechanical coupling (e.g., welding, laser welding, bonding glue, or other methods), or any suitable additional method of manufacturing.

Figure 5:
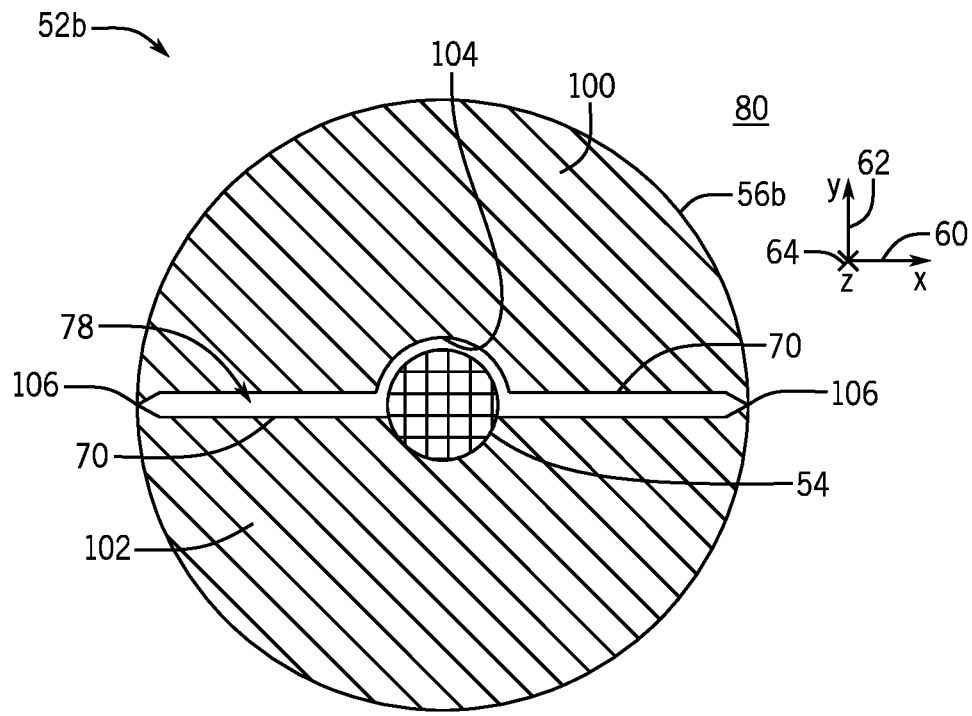
FIG. 5 is a cross-sectional view of an embodiment of the optical-fiber-containing sensor wire of FIG. 2, which illustrates a two-piece optical-fiber-containing sensor wire, in accordance with an embodiment of the present disclosure.

FIG. 5 illustrates a cross-sectional view of one embodiment of a two-piece optical-fiber-containing sensor wire 52*b*. The two-piece optical-fiber-containing sensor wire 52*b* may include a shield structure 56*b* disposed about the one or more optical fibers 54. The shield structure 56*b* may include a conductor (e.g., copper) or any alloy suitable for the desired purpose. Although FIG. 5 shows an embodiment of the shield structure 56*b* with a generally circular shape, the shield structure 56*b* may take any suitable shape, such as square, triangular, or oval.

The shield structure 56*b* may include an upper half 100 and a lower half 102. The one or more optical fibers 54 may be served into a groove 104 disposed within the upper half 100, the lower half 102, or both. The upper half 100 and lower half 102 of the shield structure 56*b* may be coupled together at edges 106 via mechanical coupling (e.g., laser seam-weld, bonding glue, other adhesive, welding, or using other connection methods). In order to ensure good mechanical coupling between the one or more optical fibers 54 and the shield structure 56*b*, the upper half 100 and lower half 102 may be compressed together while the adhesive is applied, enabling a slight transverse (e.g., 'y' direction) pressure to remain imposed upon the one or more optical fibers 54 after the adhesive has cured. In some embodiments, the groove 104 may be slightly smaller in diameter than the one or more optical fibers 54, to additionally ensure that the one or more optical fibers 54 may be in physical contact with the interior surface 70 throughout the length of the shield structure 56*b*. This may allow the one or more optical fibers 54 to sense pressure outside the shield structure 56*b*. In another embodiment, the groove 104 may be slightly larger in diameter than the one or more optical fibers 54, which may isolate the optical fiber 54 from the asymmetric stress when the shield structure 56b is compressed. This may allow the optical fiber 54 to sense additional desired parameters within the wellbore 16, such as temperature, vibration, strain, or acoustic/seismic signals.

The physical contact between the interior surface 70 and the one or more optical fibers 54 may ensure that any external pressure applied to the shield structure 56b will apply a generally transverse force (e.g., in the 'y' direction 62) to the one or more optical fibers 54 within the shield structure 56b. Ideally, the external pressure may be applied to the shield structure 56b in a direction perpendicular to the interior surface 70 of the upper half 100 and the interior surface 70 of the lower half 102 (e.g., in the 'y' direction 62). Additionally or alternatively, pressure may be applied to the shield structure 56b in any combination of the 'x' direction 60, 'y' direction 62, and/or 'z' direction 64.

The coupled edges 106 may additionally serve as a hermetic seal to form the enclosed cavity 78 between the upper half 100 and the lower half 102. As discussed in the embodiment of the one-piece optical-fiber-containing sensor wire 52a of FIG. 2, the enclosed cavity 78 may seal the one or more optical fibers 54 from contaminants (e.g., caustic chemicals) in the external environment 80, which may damage the one or more optical fibers 54.

Figure 6:
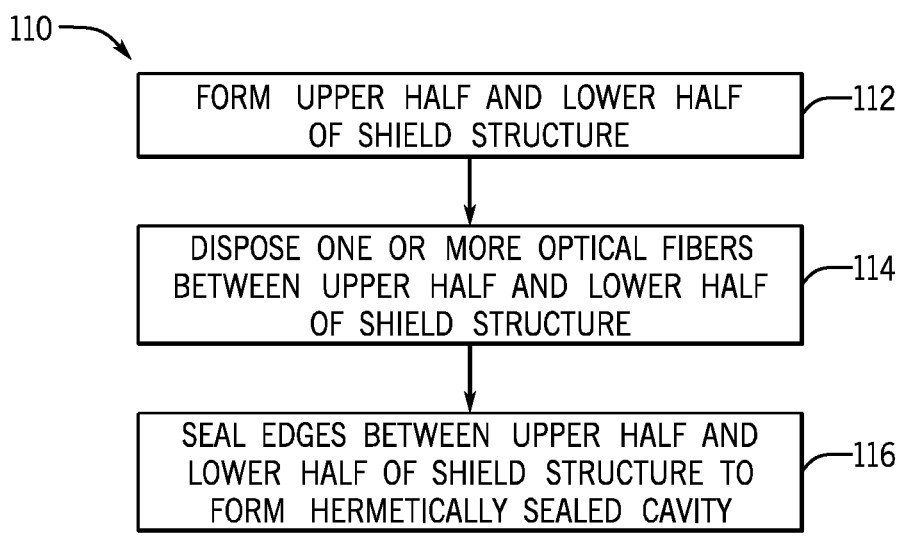
FIG. 6 is a method of manufacturing the two-piece optical-fiber-containing sensor wire of FIG. 5, in accordance with an embodiment of the present disclosure.

FIG. 6 illustrates a flow diagram of one embodiment of a method 110 for assembling the two-piece optical-fiber-containing sensor wire 52b. In block 112, the upper half 100 and lower half 102 of the shield structure 56b may be formed via extrusion through a die, machining, or any additional suitable method of manufacturing. In block 114, the one or more optical fibers 54 may be disposed between the upper half 100 and the lower half 102 of the shield structure 56b. The upper half 100, the lower half 102, or both, may include the groove 104 in which the one or more optical fibers 54 may be disposed. In block 116, the upper half 100 and lower half 102 of the shield structure 56b may be coupled together via a mechanical coupling (e.g., welding, laser welding, bonding glue, or other methods). The coupled upper half 100 and lower half 102 may form the enclosed cavity 78 which is hermetically sealed from the external environment 80.

Figure 7:
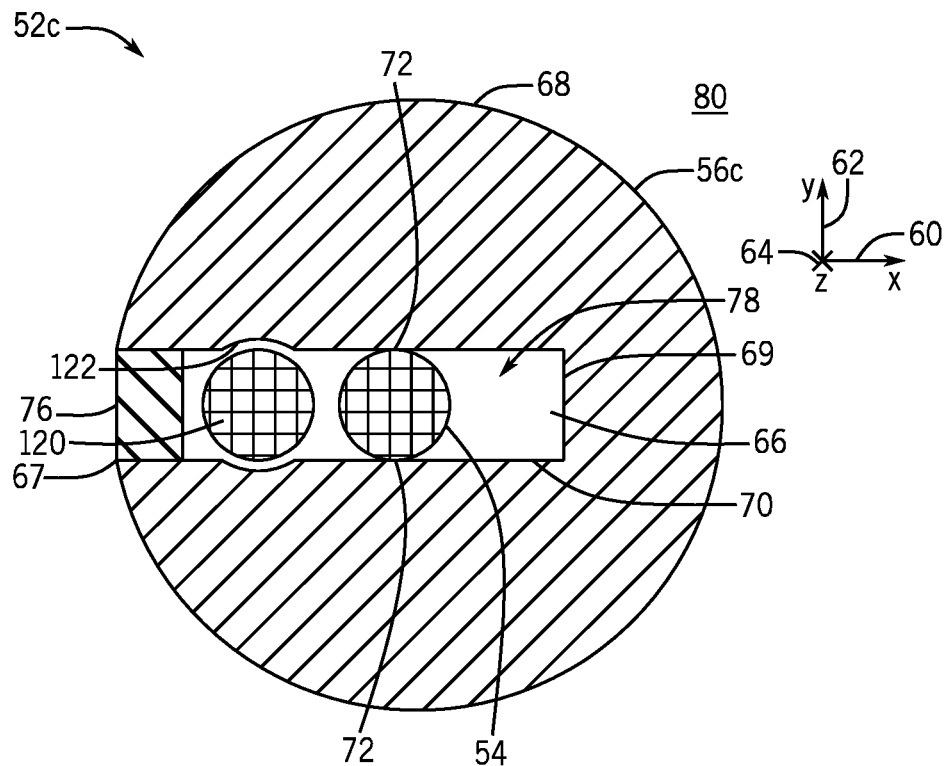
FIG. 7 is a cross-sectional view of an embodiment of the optical-fiber-containing sensor wire of FIG. 2, which illustrates a dual optical-fiber-containing sensor wire, in accordance with an embodiment of the present disclosure.

Turning now to FIG. 7, which illustrates a cross-sectional view of an embodiment of a dual optical-fiber-containing sensor wire 52c. The dual optical-fiber-containing sensor wire 52c may include a shield structure 56c disposed about the one or more optical fibers 54 and a second optical fiber 120. The shield structure 56c may include a conductor (e.g., copper) or any alloy suitable for the desired purpose. Although FIG. 7 shows an embodiment of the shield structure 56c with a generally circular or C-shape, the shield structure 56c may take any suitable shape, such as square, triangular, or oval.

The one or more optical fibers 54 and the second optical fiber 120 may be disposed within the recess 66 of the shield structure 56c. The one or more optical fibers 54 may be embedded symmetrically or asymmetrically within the recess 66. The recess 66 may extend radially from the first end portion 67 adjacent to the exterior surface 68 of the shield structure 56c towards the second end portion 69 within shield structure 56c. The second optical fiber 120 may be disposed within a grooved section 122 in the interior surface 70 of the recess 66. The grooved section 122 may form an annular cavity that is slightly larger than the diameter of the second optical fiber 120 and extend longitudinally (e.g., 'z' direction 64) along the length of the shield structured 53c. The grooved section 122 may isolate the second optical fiber 120 from the asymmetric stress experienced by the one or more optical fibers 54 when the shield structure 56c is compressed. The second optical fiber 120 may therefore be used to sense additional desired parameters within the wellbore 16, such as temperature, vibration, strain, or acoustic/seismic signals.

The one or more optical fibers 54 may be in physical contact with the interior surface 70 of the shield structure 56c. The interior surface 70 may contact the one or more optical fibers 54 at diametrically opposite contact points 72, such that the interior surface 70 may extend tangentially to the diametrically opposite contact points 72. The diametrically opposite contact points 72 may ensure that any external pressure applied to the shield structure 56c will apply a transverse (e.g., 'y' direction 62) force to the one or more optical fibers 54. Ideally, the pressure may be applied to the shield structure 56c in a direction perpendicular to the interior surface 70 of the recess 66 (e.g., 'y' direction 62). Additionally or alternatively, pressure may be applied to the shield structure 56a in any combination of the 'x' direction 60, 'y' direction 62, and/or 'z' direction 64.

The plug 76 may be inserted into the first end portion 67 of the recess 66 forming the enclosed cavity 78 within the shield structure 56c. The plug 76 may be pressure fit into the shield structure 56c and/or bonded to the shield structure via a mechanical coupling, such as welding or adhesive. The plug 76 may extend longitudinally (e.g., 'z' direction 64) along the length of the shield structure 56c and form a hermetic seal between the one or more optical fibers 54 and the second optical fiber 120 within the enclosed cavity 78, and the external environment 80. The external environment 80 may contain fluids which can damage a coating of the one or more optical fibers 54 and/or the second optical fiber 120 which may result in optical losses within the one or more optical fibers 54 and/or the second optical fiber 120.

The plug 76 may additionally form an elongated pressure seal which may ensure that the pressure differential between the enclosed cavity 78 and external environment 80 is not equalized. Maintaining the pressure difference between the enclosed cavity 78 and external environment 80 may enable the one or more optical fibers 54 to accurately detect pressure distributions within the wellbore 16. The plug may include any suitable material, such as copper or aluminum.

Figure 8:
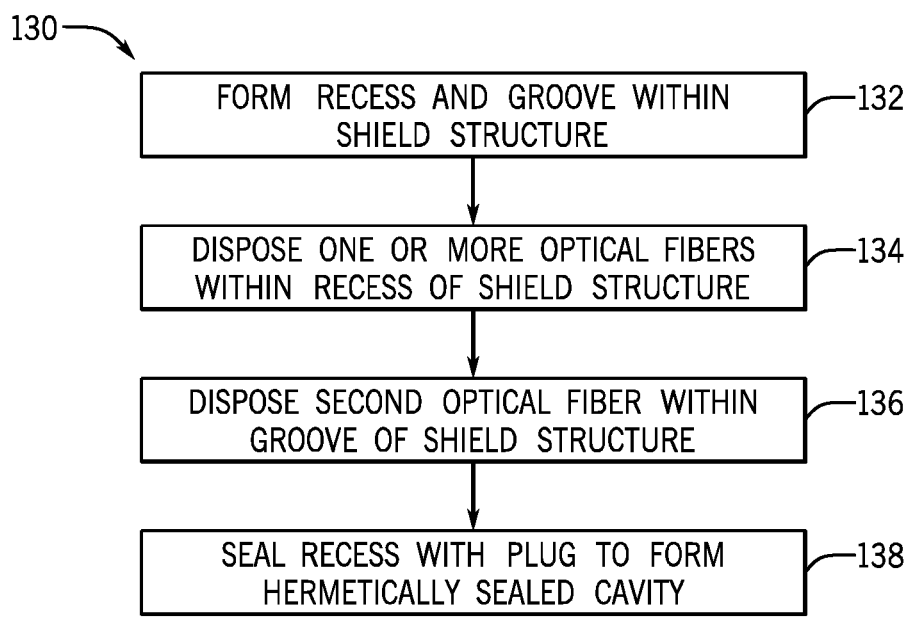
FIG. 8 is a method of manufacturing the dual optical-fiber-containing sensor wire of FIG. 7, in accordance with an embodiment of the present disclosure.

Referring now to FIG. 8, a flow diagram of one embodiment of a method 130 for assembling the dual optical-fiber-containing sensor wire 52c. In block 132, the recess 66 and grooved section 122 may be formed within the shield structure 56c. The recess 66 and grooved section 122 may be formed by extruding the shield structure 56c through a die, machining the shield structure 56c, or any additional suitable method of manufacturing. In block 134, the one or more optical fibers 54 may be disposed within the recess 66 of the shield structure 56c. In block 136, the second optical fiber 120 may be disposed within the grooved section 122 of the recess 66. In block 138, the plug 76 may be coupled to the first end portion 67 of the recess 66 to form the enclosed cavity 78 within the shield structure 56c. The plug 76 may be coupled to the shield structure 56c via press fit (e.g., crimping), via a mechanical coupling, such as welding or adhesive, or any additional suitable method of manufacturing.

Figure 9:
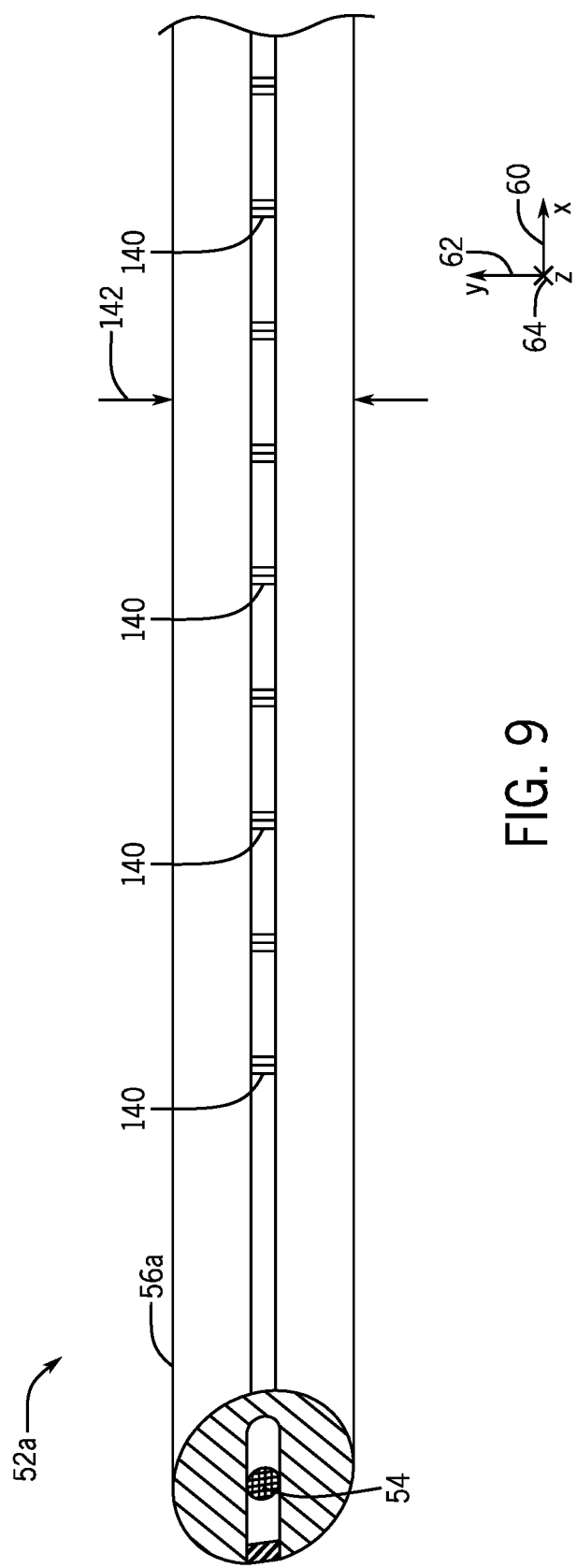
FIG. 9 is a perspective view of the optical-fiber-containing sensor wire, in accordance with one embodiment of the present disclosure.

Turning now to FIG. 9, which illustrates a perspective view of the one-piece optical-fiber-containing sensor wire 52a and the shield structure 56a. The following discussion may additionally apply to any embodiment of the optical-fiber-containing sensor wire 52, such as the two-piece optical-fiber-containing sensor wire 52b and the dual optical-fiber-containing sensor wire 52c. The one-piece optical-fiber-containing sensor wire 52a may be manufactured continuously in long lengths (e.g., multiple kilometers) and may measure desired parameters (e.g., static pressure, dynamic pressure, temperature, strain, or other) of the wellbore 16 along this length. The one-piece optical-fiber-containing sensor wire 52a may eliminate the need for individual single point sensors to be employed throughout the span of the cable 18 in order to obtain measurements along the length of the wellbore 16.

The one or more optical fibers 54 composed within the one-piece optical-fiber-containing sensor wire 52a may contain one or more discrete reflectors 140 (e.g., sensing points) disposed along the length of the one or more optical fibers 54. The reflectors 140 may be interrogated individually as multiplexed sensor points and/or act as delimiters to define sensing regions between adjacent reflectors 140. In another embodiment, the reflectors 140 may be placed adjacent to one another at close intervals, which may enhance the backscatter from the one or more optical fibers 54.

Pressure within the wellbore 16 may apply a compressive force 142 upon the one-piece optical-fiber-containing sensor wire 52a. The compressive force 142 may compress the recess 66 and hence deform the one or more optical fibers 54 asymmetrically. For example, in the shown embodiment, the compressive force 142 may compress the one or more optical fibers 54 transversely (e.g., 'y' direction). The reflectors 140 may be interrogated using wavelength division multiplexing, time or frequency domain reflectometry, and/or any other suitable techniques for optical fiber sensing. The data processing system 28 may be used to extrapolate the desired parameters from within the wellbore 16.

In the case of time-division multiplexing, a probe pulse with sufficient bandwidth is launched into the optical fiber 54 and/or 120 and each reflector 140 returns a pulse that is filtered by the reflection spectrum of that reflector 140; for a birefringent reflector the reflection spectrum may include a pair of spectral lines that shift in opposite directions (i.e. move further or closer apart) in response to the birefringence (their mean reflective wavelength may be indicative of temperature and strain).

In a second approach, the birefringence of each section of optical fiber 54, delineated by an adjacent pair of reflectors, may be measured, for example as described using a technique described by U.S. Pat. No. 7,548,319, "Interferometric Method and Apparatus for Measuring Physical Parameters," filed on Jan. 20, 2004, which is incorporated by reference in its entirety for all purposes.

A third approach for interrogating the pressure may be fully distributed and determines the distribution of the optical fiber 54 birefringence along the optical fiber 54 using frequency-swept coherent Rayleigh reflectometry, techniques for which are described in U.S. Pat. No. 6,545,760, "Apparatus and Method for Measuring Strain in Optical Fibers using Rayleigh Backscatter," filed Mar. 24, 2000, U.S. Application No. PCT/US2006/008438, "Calculation of Birefringence in a Waveguide Based on Rayleigh Scatter," filed Mar. 9, 2006, both of which are incorporated by reference in their entirety for all purpose. This may be used in a combination of time and frequency-domain interrogation as described by U.S. Pat. No. 7,859,654, "Frequency-Scanned Optical Time-Domain Reflectometry," filed Jul. 17, 2007, which is also incorporated by reference in its entirety for all purposes.

In some cases, only dynamic changes of the birefringence may be used to discern a parameter. This may be the case, for example, where one wants to measure seismic waves. A form of distribution acoustic sensing (DAS) (also known as distributed vibration sensing) is increasingly used in borehole seismic acquisition. This technique measures the dynamic strain on the optical fiber 54 and responds primarily to axial strain. It may be desirable also to measure the dynamic pressure as would be reported, for example by a hydrophone. A number of techniques may be used for DAS/DVS. Using such techniques on each axis of the pressure-fibre shown in FIGS. 3, 5, 7, and 9 may allow both the pressure signal (differential between the two axes) and the dynamic strain signal to be extracted (using the common-mode signal content of the two axes). Here, the central optical fiber 54 may act as both a distributed hydrophone and a distributed sensor of dynamic axial strain. This may allow, for example, for up/down wave separation and in some applications, and may also overcome the directional sensitivity of a pure axial measurement.

Continuing to consider the uses of the pressure-sensitive optical fiber 54 as a distributed hydrophone, in the case of reflector arrays, the dynamic birefringence of each section delineated by a pair of reflectors can be determined using, for example, techniques disclosed in U.S. Pat. No. 8,401,401, "Polarization-Diverse, Heterodyne Optical Receiving System," filed Oct. 14, 2009, which is incorporated by reference in its entirety for all purposes.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A cable comprising:
   an optical-fiber-containing sensor wire that includes:
      a shielding structure comprising at least one metallic wire shaped to form an interior recess;
      a first optical fiber disposed within the interior recess; and
      a seal configured to hermetically seal the optical fiber in a longitudinal span of the interior recess.

2. The cable of claim 1, wherein the first optical fiber is tightly placed in direct contact with two opposite sides of the interior recess to allow the first optical fiber to sense external pressure when the external pressure is applied to the shielding material.

3. The cable of claim 2, wherein the first optical fiber is disposed asymmetrically within the interior recess.

4. The cable of claim 1, wherein the first optical fiber is loosely placed not to directly contact more than one side of the interior recess at any time to allow the first optical fiber to sense a parameter substantially free of noise due to external pressure on the shielding material.

5. The cable of claim 1, comprising a second optical fiber disposed within the interior recess, wherein:
   the first optical fiber is tightly placed in direct contact with two opposite sides of the interior recess to allow the first optical fiber to sense external pressure when the external pressure is applied to the shielding material; and
   the second optical fiber is loosely placed not to directly contact more than one side of the interior recess at any time to allow the second optical fiber to sense a parameter other than pressure substantially free of noise due to external pressure on the shielding material.

6. The cable of claim 1, wherein the at least one metallic wire comprises a single metallic wire shaped to form the interior recess.

7. The cable of claim 1, wherein the at least one metallic wire comprises a plurality of metallic wires shaped to form the interior recess when joined together.

8. The cable of claim 1, wherein air is hermetically sealed in the interior recess.

9. The cable of claim 1, comprising a cable core, wherein the optical-fiber-containing sensor wire is disposed within the cable core.

10. The cable of claim 1, comprising a cable core, wherein the optical-fiber-containing sensor wire is disposed within an armor wire strength member that surrounds the cable core.

11. The cable of claim 1, comprising one or more reflectors in the first optical fiber, wherein the one or more reflectors are configured to define a location of points that are sensed along the cable using the first optical fiber.

12. A method comprising:
disposing a first optical fiber in an interior recess of a wire shield structure comprising at least one metallic wire and having a longitudinal span that contains the interior recess; and
hermetically sealing the interior recess at least along the longitudinal span of the wire shield structure.

13. The method of claim 12, comprising forming the interior recess by removing material from a single wire that makes up the wire shield structure.

14. The method of claim 12, wherein hermetically sealing the interior recess comprises joining two wires having shapes that, when the two wires are joined together, form the interior recess.

15. The method of claim 12, wherein the first optical fiber is disposed in the interior recess at least in part by tightly placing the first optical fiber in direct contact with two opposite sides of the interior recess to allow the first optical fiber to sense external pressure when the external pressure is applied to the shielding material.

16. The method of claim 12, wherein the first optical fiber is disposed in the interior recess at least in part by loosely placing the first optical fiber not to directly contact more than one side of the interior recess at any single axial location to allow the first optical fiber to sense a parameter other than pressure substantially free of noise due to external pressure on the shielding material.

17. The method of claim 12, comprising disposing a second optical fiber within the interior recess, wherein:
the first optical fiber is tightly disposed in direct contact with two opposite sides of the interior recess to allow the first optical fiber to sense external pressure when the external pressure is applied to the shielding material; and
the second optical fiber is loosely disposed not to directly contact more than one side of the interior recess at any time to allow the second optical fiber to sense a parameter other than pressure substantially free of noise due to external pressure on the shielding material.

18. An optical-fiber-containing sensor wire for a cable configured to be placed downhole in a wellbore, wherein the optical-fiber-containing sensor wire comprises a first optical fiber hermetically sealed within a metallic structure of the optical-fiber-containing sensor wire, the metallic structure having an interior recess.

19. The optical-fiber-containing sensor wire of claim 18, wherein the first optical fiber is disposed in an interior recess of the optical-fiber-containing sensor wire in direct contact with two opposite sides of the interior recess to allow the first optical fiber to sense external pressure when the external pressure is applied to the optical-fiber-containing sensor wire.

20. The optical-fiber-containing sensor wire of claim 18, wherein the first optical fiber is disposed in an interior recess of the optical-fiber-containing sensor wire loosely and not in direct contact with more than one side of the interior recess at any axial location to allow the first optical fiber to sense a parameter other than pressure substantially free of noise due to external pressure on the optical-fiber-containing sensor wire.

* * * * *